(12) United States Patent
Kim et al.

(10) Patent No.: US 8,149,189 B2
(45) Date of Patent: Apr. 3, 2012

(54) ORGANIC LIGHT EMITTING DIODE DISPLAY

(75) Inventors: Seung-Tae Kim, Goyang-si (KR);
Han-Jin Bae, Euiwang-si (KR);
Won-Kyu Ha, Gumi-si (KR); Ji-Hun Kim, Namyangju-si (KR)

(73) Assignee: LG. Display Co. Ltd., Seoul (KR)

( * ) Notice: Subject to any disclaimer, the term of this patent is extended or adjusted under 35 U.S.C. 154(b) by 456 days.

(21) Appl. No.: 12/482,141

(22) Filed: Jun. 10, 2009

(65) Prior Publication Data
US 2010/0109540 A1    May 6, 2010

(30) Foreign Application Priority Data

Oct. 30, 2008 (KR) .......................... 10-2008-106908

(51) Int. Cl.
*G09G 3/32* (2006.01)
(52) U.S. Cl. ............................. 345/76; 315/82; 315/204
(58) Field of Classification Search ............... 315/169.1, 315/169.2, 169.3; 345/204, 76, 77, 78, 79, 345/80, 82, 55, 205, 690
See application file for complete search history.

(56) References Cited

U.S. PATENT DOCUMENTS

| 7,167,169 B2* | 1/2007 | Libsch et al. ................. 345/211 |
| 7,187,133 B2* | 3/2007 | Oh ............................. 315/169.3 |
| 7,239,296 B2* | 7/2007 | Cheng et al. ..................... 345/82 |

FOREIGN PATENT DOCUMENTS

| CN | 1742308 A | 3/2006 |
| CN | 101079233 A | 11/2007 |

OTHER PUBLICATIONS

Office Action issued in corresponding Chinese Patent Application No. 200910159813.4, mailed Aug. 10, 2011.

* cited by examiner

*Primary Examiner* — David Hung Vu
(74) *Attorney, Agent, or Firm* — Brinks Hofer Gilson & Lione

(57) ABSTRACT

An organic light emitting diode display includes a first scan switching element controlled in response to a first scan signal from a first scan line and connected between a first data line and a first node, a first storage capacitor connected between the first node and an AC voltage supply line, a first driving switching element controlled in response to a signal applied to the first node and connected between a second node and the AC voltage supply line, a light emitting element connected between a high-level voltage supply line and the second node, a first sensing switching element controlled in response to a first gate signal from a first gate line and connected between the first data line and the second node, a second scan switching element controlled in response to a second scan signal from a second scan line and connected between a second data line and a third node, a second storage capacitor connected between the third node and the AC voltage supply line, and a second driving switching element controlled in response to a signal applied to the third node and connected between the second node and the AC voltage supply line.

4 Claims, 4 Drawing Sheets

ORGANIC LIGHT EMITTING DIODE DISPLAY

RELATED APPLICATIONS

This application claims the benefit of Korean Patent Application No. 10-2008-0106908 filed on Oct. 30, 2008 which is hereby incorporated by reference as if fully set forth herein.

BACKGROUND

1. Field of the Invention

The present disclosure relates to an organic light emitting diode display, and more particularly, to an organic light emitting diode display which is capable of preventing a driving switching element from being deteriorated.

2. Discussion of the Related Art

Recently, various flat panel displays which are small and low in weight compared with a cathode ray tube have been developed, and a light emitting display which has a high luminous efficiency, excellent brightness, wide viewing angle and high response speed, among the flat panel displays, has been especially highlighted.

A light emitting element has a structure where a light emitting layer, which is a thin film emitting light, is disposed between a cathode electrode and an anode electrode, and a characteristic where excitons are generated in the light emitting layer by injecting electrons and holes into the light emitting layer and recombining them therein and light is emitted from the light emitting layer when the generated excitons falls to their low energy states.

The light emitting layer of the light emitting element is composed of an inorganic material or organic material, and the light emitting element is classified into an inorganic light emitting element and an organic light emitting element according to the material type of the light emitting layer.

The level of driving current flowing to the light emitting element has a large deviation depending on a threshold voltage of a driving switching element provided in each pixel. Because driving switching elements of respective pixels have different threshold voltage characteristics due to a manufacturing characteristic of an organic light emitting diode display, driving currents flowing through the driving switching elements of the respective pixels may have different values in spite of the same data voltage, resulting in a problem that a picture quality may be degraded due to brightness differences among light emitting elements of the respective pixels.

Further, because a positive data voltage is continuously supplied to the gate electrode of the driving switching element, the driving switching element may be subject to a severe deterioration, resulting in a problem that the threshold voltage of the driving switching element may vary.

BRIEF SUMMARY

An organic light emitting diode display includes: a first scan switching element controlled in response to a first scan signal from a first scan line, the first scan switching element being connected between a first data line and a first node; a first storage capacitor connected between the first node and an alternating current (AC) voltage supply line; a first driving switching element controlled in response to a signal applied to the first node, the first driving switching element being connected between a second node and the AC voltage supply line; a light emitting element connected between a high-level voltage supply line and the second node; a first sensing switching element controlled in response to a first gate signal from a first gate line, the first sensing switching element being connected between the first data line and the second node; a second scan switching element controlled in response to a second scan signal from a second scan line, the second scan switching element being connected between a second data line and a third node; a second storage capacitor connected between the third node and the AC voltage supply line; and a second driving switching element controlled in response to a signal applied to the third node, the second driving switching element being connected between the second node and the AC voltage supply line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
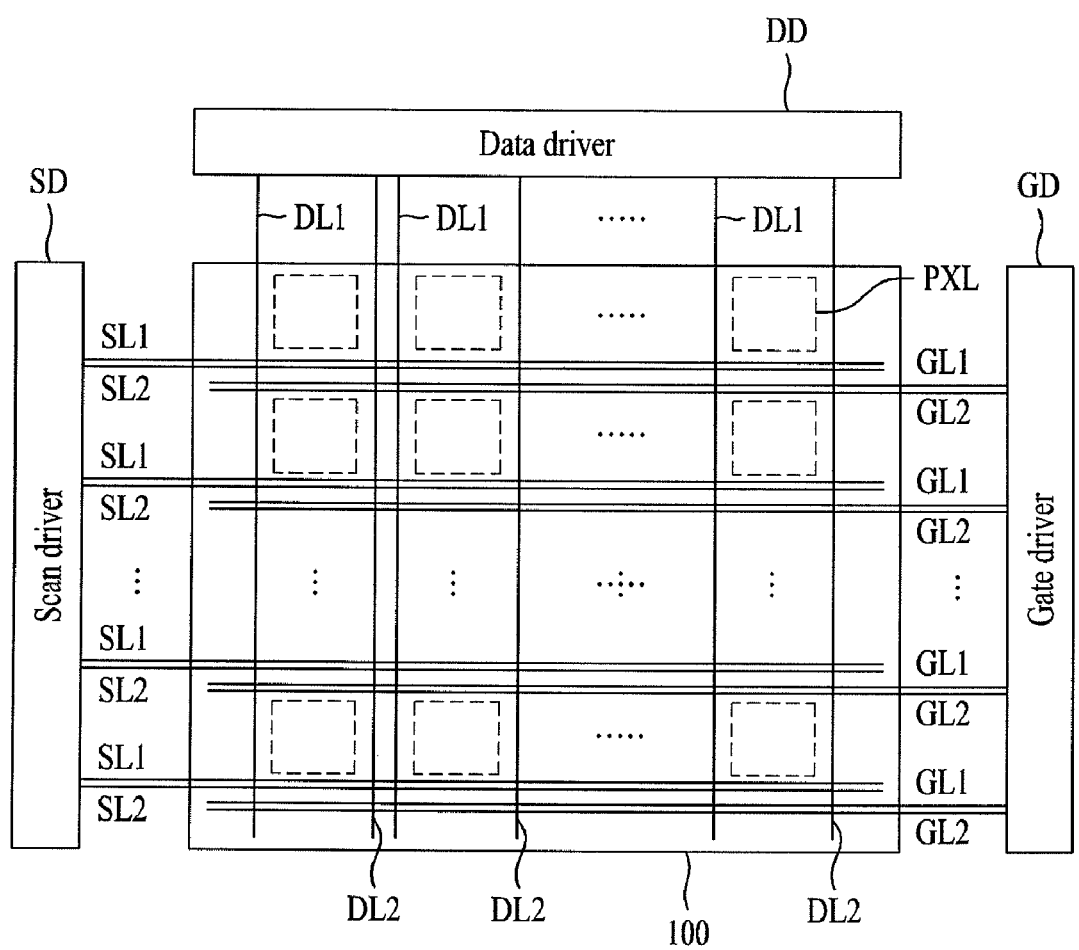
FIG. 1 is a schematic view of an organic light emitting diode display according to an embodiment.

FIG. 1 is a schematic view of an organic light emitting diode display according to an embodiment.

Referring to FIG. 1, the organic light emitting diode display includes a display panel 100 including a plurality of first and second data lines each supplied with a threshold voltage Vth detection voltage or data voltage, a plurality of first scan lines sequentially supplied with a first scan signal, a plurality of second scan lines sequentially supplied with a second scan signal, a plurality of first gate lines sequentially supplied with a first gate signal, a plurality of second gate lines sequentially supplied with a second gate signal and a plurality of pixels PXL, a gate driver GD for driving the first and second gate lines, a scan driver SD for driving the first and second scan lines, and a data driver DD for supplying the threshold voltage Vth detection voltage or the data voltage, which has information about an image, to each of the first and second data lines.

The scan driver SD sequentially supplies the first scan signal to the first scan lines to drive the first scan lines in order, and sequentially supplies the second scan signal to the second scan lines to drive the second scan lines in order.

The gate driver GD sequentially supplies the first gate signal to the first gate lines to drive the first gate lines in order, and sequentially supplies the second gate signal to the second gate lines to drive the second gate lines in order.

The data driver DD generates data voltages in response to data control signals, not shown, and supplies the generated data voltages to the first or second data lines, respectively. At this time, the data driver DD supplies data voltages of one horizontal line respectively to the first or second data lines in every one horizontal period. Also, the data driver DD supplies threshold voltage Vth detection voltages for detection of threshold voltages Vth of driving switching elements Tr_Dv provided in the respective pixels to the first or second data lines, respectively. At this time, the data driver DD supplies threshold voltage detection voltages of one horizontal line respectively to the first or second data lines in every one horizontal period. Also, the data driver DD supplies an initial voltage to each sensing line to detect the threshold voltage Vth of each driving switching element Tr_Dv, and reads a compensation voltage generated on each sensing line and stores the read voltage in a memory provided therein.

Hereinafter, the structure of each pixel PXL will be described in detail.

Figure 2:
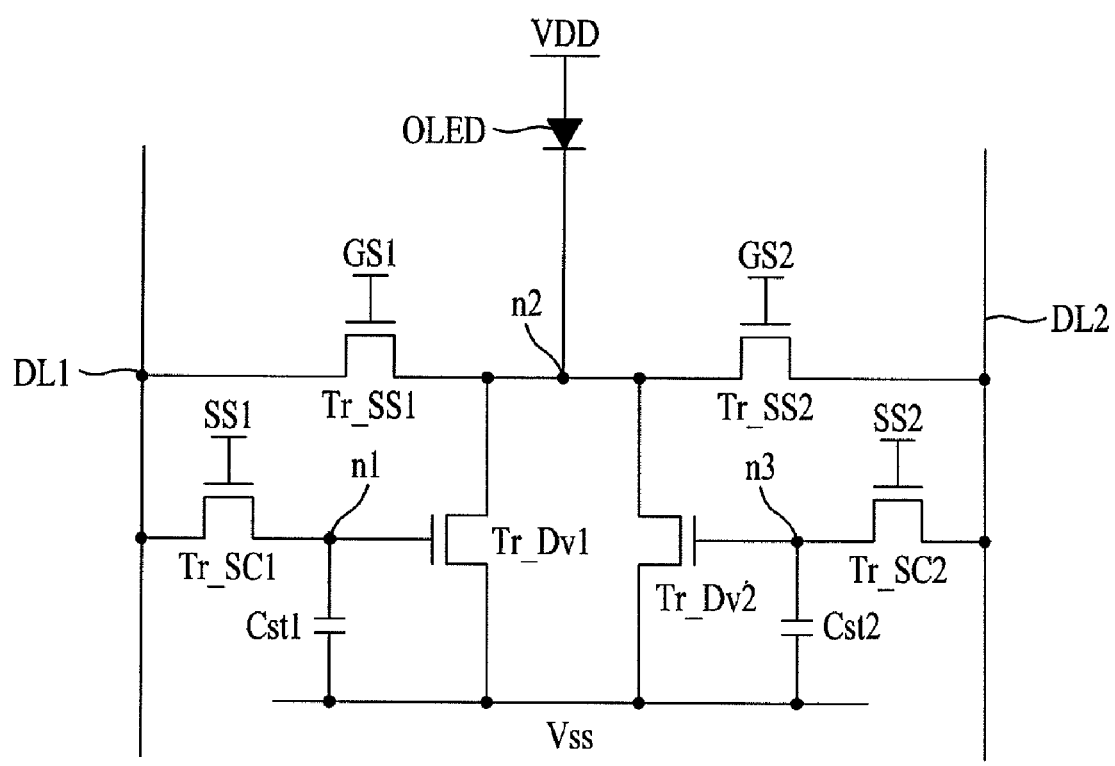
FIG. 2 is a circuit diagram showing the structure of one pixel in the organic light emitting diode display.

FIG. 2 is a circuit diagram showing the structure of one pixel PXL in the organic light emitting diode display.

One pixel PXL includes, as shown in FIG. 2, first and second scan switching elements Tr_SC1 and Tr_SC2, first and second storage capacitors Cst1 and Cst2, first and second driving switching elements Tr_Dv1 and Tr_Dv2, first and second sensing switching elements Tr_SS1 and Tr_SS2, and a light emitting element OLED.

The first scan switching element Tr_SC1 is controlled in response to a first scan signal SS1 from a first scan line SL1, and is connected between a first data line DL1 and a first node n1. That is, the first scan switching element Tr_SC1 is turned on or off according to a logic state of the first scan signal SS1, and electrically connects the first data line DL1 and the first node n1 with each other when turned on. To this end, the first scan switching element Tr_SC1 has a gate electrode connected to the first scan line SL1, a drain electrode connected to the first data line DL1, and a source electrode connected to the first node n1.

The first storage capacitor Cst1 is connected between the first node n1 and an alternating current (AC) voltage supply line.

The first driving switching element Tr_Dv1 is controlled in response to a signal applied to the first node n1, and is connected between a second node n2 and the AC voltage supply line. That is, the first driving switching element Tr_Dv1 is turned on or off according to a logic of a voltage applied to the first node n1, and electrically connects the second node n2 and the AC voltage supply line with each other when turned on. To this end, the first driving switching element Tr_Dv1 has a gate electrode connected to the first node n1, a drain electrode connected to the second node n2, and a source electrode connected to the AC voltage supply line.

The light emitting element OLED is connected between a high-level voltage supply line and the second node n2.

The first sensing switching element Tr_SS1 is controlled in response to a first gate signal GS1 from a first gate line GL1, and is connected between the first data line DL1 and the second node n2. That is, the first sensing switching element Tr_SS1 is turned on or off according to a logic state of the first gate signal GS1, and electrically connects the first data line DL1 and the second node n2 with each other when turned on. To this end, the first sensing switching element Tr_SS1 has a gate electrode connected to the first gate line GL1, a drain electrode connected to the first data line DL1, and a source electrode connected to the second node n2.

The second scan switching element Tr_SC2 is controlled in response to a second scan signal SS2 from a second scan line SL2, and is connected between a second data line DL2 and a third node n3. That is, the second scan switching element Tr_SC2 is turned on or off according to a logic state of the second scan signal SS2, and electrically connects the second data line DL2 and the third node n3 with each other when turned on. To this end, the second scan switching element Tr_SC2 has a gate electrode connected to the second scan line SL2, a drain electrode connected to the second data line DL2, and a source electrode connected to the third node n3.

The second storage capacitor Cst2 is connected between the third node n3 and the AC voltage supply line.

The second driving switching element Tr_Dv2 is controlled in response to a signal applied to the third node n3, and is connected between the second node n2 and the AC voltage supply line. That is, the second driving switching element Tr_Dv2 is turned on or off according to a logic of a voltage applied to the third node n3, and electrically connects the second node n2 and the AC voltage supply line with each other when turned on. To this end, the second driving switching element Tr_Dv2 has a gate electrode connected to the third node n3, a drain electrode connected to the second node n2, and a source electrode connected to the AC voltage supply line.

The second sensing switching element Tr_SS2 is controlled in response to a second gate signal GS2 from a second gate line GL2, and is connected between the second data line DL2 and the second node n2. That is, the second sensing switching element Tr_SS2 is turned on or off according to a logic state of the second gate signal GS2, and electrically connects the second data line DL2 and the second node n2 with each other when turned on. To this end, the second sensing switching element Tr_SS2 has a gate electrode connected to the second gate line GL2, a drain electrode connected to the second data line DL2, and a source electrode connected to the second node n2.

Figure 3A:
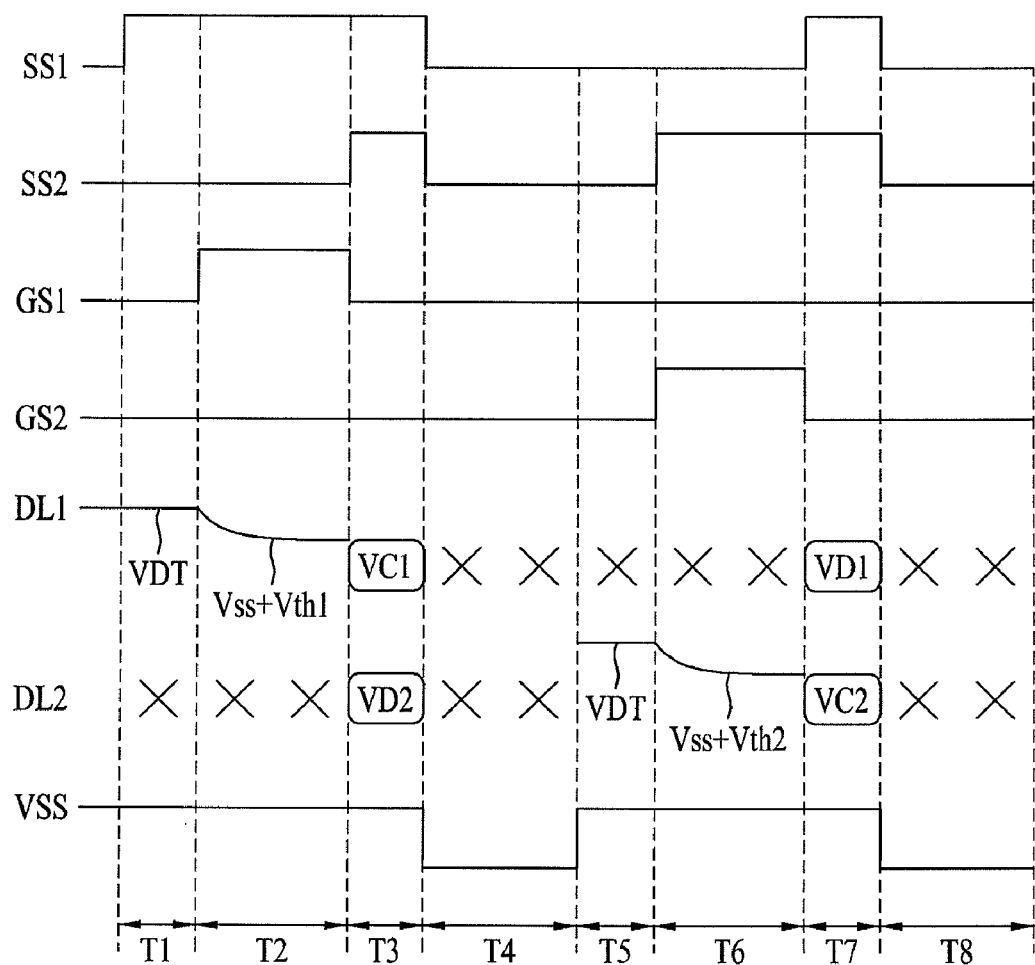
FIG. 3A is a first timing diagram of various signals which are supplied to the pixel of FIG. 2.
Figure 3B:
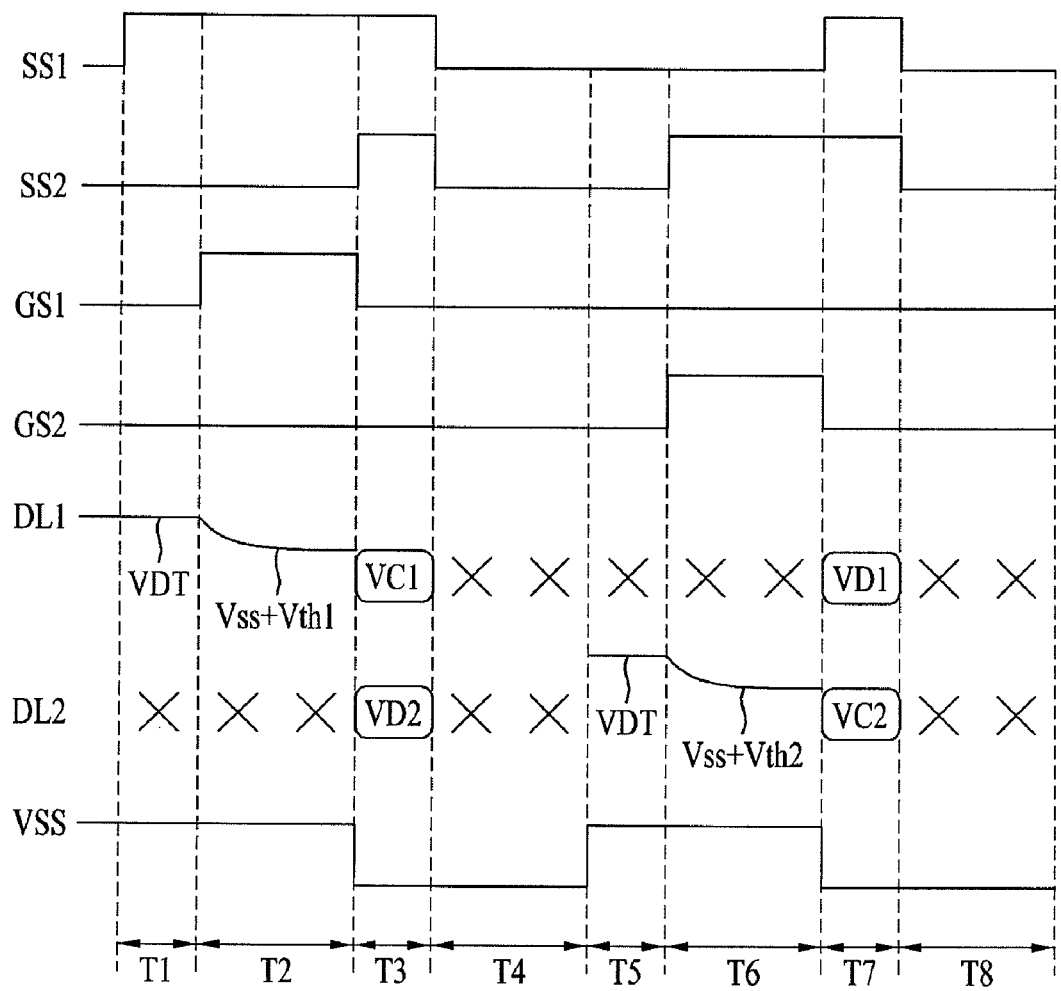
FIG. 3B is a second timing diagram of the various signals which are supplied to the pixel of FIG. 2.

The pixel PXL configured in this manner is driven separately in first to eighth periods, in which the aforementioned respective signals have timings as shown in FIG. 3A or 3B.

FIG. 3A is a first timing diagram of various signals which are supplied to the pixel PXL of FIG. 2.

As shown in FIG. 3A, an AC voltage VSS from the AC voltage supply line exhibits a first voltage in first to third periods T1 to T3 and fifth to seventh periods T5 to T7, while a second voltage in fourth and eighth periods T4 and T8. Here, the first voltage is higher than the second voltage.

The first scan signal SS1 exhibits an active state in the first to third periods T1 to T3 and the seventh period T7, while an inactive state in the fourth to sixth periods T4 to T6 and the eighth period T8. Here, the active state means a high state, and the inactive state means a low state.

The second scan signal SS2 exhibits the active state in the third period T3 and the sixth and seventh periods T6 and T7, while the inactive state in the first and second periods T1 and T2, the fourth and fifth periods T4 and T5 and the eighth period T8.

The first gate signal GS1 exhibits the active state in the second period T2, while the inactive state in the first period T1 and the third to eighth periods T3 to T8.

The second gate signal GS2 exhibits the active state in the sixth period T6, while the inactive state in the first to fifth periods T1 to T5 and the seventh and eighth periods T7 and T8.

A threshold voltage detection voltage VDT is supplied to the first data line DL1 in the first period T1 and to the second data line DL2 in the fifth period T5.

A corrected data voltage VD2 is supplied to the second data line DL2 in the third period T3, and a deterioration prevention voltage VC1, which has a polarity opposite to that of the corrected data voltage VD2, is supplied to the first data line DL1 in the third period T3.

A corrected data voltage VD1 is supplied to the first data line DL1 in the seventh period T7, and a deterioration prevention voltage VC2, which has a polarity opposite to that of the corrected data voltage VD1, is supplied to the second data line DL2 in the seventh period T7.

Hereinafter, the operation of the pixel PXL with this structure will be described.

In the first period T1, as shown in FIG. 3A, the first and second scan signals SS1 and SS2 and the first and second gate signals GS1 and GS2 all have the inactive state, or low state. As a result, all the switching elements are kept turned off. In this first period T1, the threshold voltage detection voltage VDT is supplied to the first data line DL1. The threshold voltage detection voltage VDT is higher than a high-level voltage VDD. Also, this threshold voltage detection voltage VDT is higher than the first voltage of the AC voltage VSS.

In the second period T2, as shown in FIG. 3A, the first scan signal SS1 and the first gate signal GS1 both have the active state, or high state. As a result, the first scan switching element Tr_SC1, supplied with the first scan signal SS1 of the high state through the gate electrode thereof, is turned on, and the first sensing switching element Tr_SS1, supplied with the first gate signal GS1 of the high state through the gate electrode thereof, is turned on. At this time, as the first scan switching element Tr_SC1 and the first sensing switching element Tr_SS1 are both turned on, the gate electrode and drain electrode of the first driving switching element Tr_Dv1 are connected with each other. Accordingly, the first driving switching element Tr_Dv1 is driven as a diode.

The threshold voltage detection voltage VDT is supplied to the first node n1 through the turned-on first scan switching element Tr_SC1 and also to the second node n2 through the turned-on first sensing switching element Tr_SS1. That is, the threshold voltage detection voltage VDT is supplied to the gate electrode and drain electrode of the first driving switching element Tr_Dv1. Also, in this second period T2, the first voltage of the AC voltage VSS is supplied to the source electrode of the first driving switching element Tr_Dv1.

On the other hand, in the second period T2, the supply of the threshold voltage detection voltage VDT to the first data line DL1 is cut off, thereby causing the first data line DL1 to be kept floating. As a result, for the second period T2, the voltage level of the first data line DL1 is influenced by the driving of the first driving switching element Tr_Dv1. That is, the flow of current from the drain electrode of the first driving switching element Tr_Dv1 to the source electrode thereof occurs due to the turning-on of the first driving switching element Tr_Dv1, and, accordingly, at the moment that the first driving switching element Tr_Dv1 is turned off, a voltage at the drain electrode thereof, namely, the second node n2 is defined as a compensation voltage VSS+Vth1 that is the sum of the first voltage of the AC voltage VSS and a threshold voltage Vth1 of the first driving switching element Tr_Dv1. This compensation voltage VSS+Vth1 is supplied to the first data line DL1 through the turned-on first sensing switching element Tr_SS1. Consequently, in the second period T2, a voltage on the first data line DL1 is defined as the compensation voltage VSS+Vth1.

The compensation voltage VSS+Vth1 from the first data line DL1 is supplied to the data driver DD and then stored in the memory provided in the data driver DD. The data driver DD corrects the original data voltage using the compensation voltage VSS+Vth1 stored in the memory, and supplies the corrected data voltage VD1 to the first data line DL1 in the seventh period T7. An operation in the seventh period T7 will be described below.

In the third period T3, only the first and second scan signals SS1 and SS2 have the active state, or high state. As a result, the first scan switching element Tr_SC1, supplied with the first scan signal SS1 of the high state through the gate electrode thereof, is turned on, and the second scan switching element Tr_SC2, supplied with the second scan signal SS2 of the high state through the gate electrode thereof, is turned on.

On the other hand, for this third period T3, the deterioration prevention voltage VC1 is supplied to the first data line DL1 and the corrected data voltage VD2 is supplied to the second data line DL2.

The deterioration prevention voltage VC1 supplied to the first data line DL1 is supplied to the first node n1, namely, the gate electrode of the first driving switching element Tr_Dv1 through the turned-on first scan switching element Tr_SC1. Because the deterioration prevention voltage VC1 has a polarity opposite to that of the data voltage (i.e., the corrected data voltage VD2 supplied to the second data line), the first driving switching element Tr_Dv1, supplied with a positive corrected data voltage in a previous frame period, is prevented from deterioration by the negative deterioration prevention voltage VC1 supplied in this third period T3.

Meanwhile, the corrected data voltage VD2 supplied to the second data line DL2 is supplied to the third node n3, namely, the gate electrode of the second driving switching element Tr_Dv2 through the turned-on second scan switching element Tr_SC2. The corrected data voltage VD2 at the third node n3 is stably maintained by the second storage capacitor Cst2.

Thereafter, in the fourth period T4, the AC voltage VSS is changed from the first voltage to the second voltage, thereby causing the second driving switching element Tr_Dv2 to be turned on, resulting in generation of driving current flowing from the drain electrode of the turned-on second driving switching element Tr_Dv2 to the source electrode thereof. As a result, in this fourth period T4, the light emitting element OLED emits light with a brightness corresponding to the corrected data voltage Tr_Dv2.

On the other hand, periods indicated by 'X' are periods for which connections between the first and second data lines DL1 and DL2 and the data driver DD are cut off. In these periods, the first and second data lines DL1 and DL2 are kept floating.

In the fifth period T5, as shown in FIG. 3A, the first and second scan signals SS1 and SS2 and the first and second gate signals GS1 and GS2 all have the inactive state, or low state. As a result, all the switching elements are kept turned off. In this fifth period T5, the threshold voltage detection voltage VDT is supplied to the second data line DL2. The threshold voltage detection voltage VDT is higher than the high-level voltage VDD. Also, this threshold voltage detection voltage VDT is higher than the first voltage of the AC voltage VSS.

In the sixth period T6, as shown in FIG. 3A, the second scan signal SS2 and the second gate signal GS2 both have the active state, or high state. As a result, the second scan switching element Tr_SC2, supplied with the second scan signal SS2 of the high state through the gate electrode thereof, is turned on, and the second sensing switching element Tr_SS2, supplied with the second gate signal GS2 of the high state through the gate electrode thereof, is turned on. As the second scan switching element Tr_SC2 and the second sensing switching element Tr_SS2 are both turned on, the gate electrode and drain electrode of the second driving switching element Tr_Dv2 are connected with each other. Accordingly, the second driving switching element Tr_Dv2 is driven as a diode.

The threshold voltage detection voltage VDT is supplied to the third node n3 through the turned-on second scan switching element Tr_SC2 and also to the second node n2 through the turned-on second sensing switching element Tr_SS2. That is, the threshold voltage detection voltage VDT is supplied to the gate electrode and drain electrode of the second driving switching element Tr_Dv2. Also, in this sixth period T6, the first voltage of the AC voltage VSS is supplied to the source electrode of the second driving switching element Tr_Dv2.

On the other hand, in the sixth period T6, the supply of the threshold voltage detection voltage VDT to the second data line DL2 is cut off, thereby causing the second data line DL2 to be kept floating. As a result, for the sixth period T6, the voltage level of the second data line DL2 is influenced by the driving of the second driving switching element Tr_Dv2. That is, the flow of current from the drain electrode of the second driving switching element Tr_Dv2 to the source electrode thereof occurs due to the turning-on of the second driving switching element Tr_Dv2, and, accordingly, at the moment that the second driving switching element Tr_Dv2 is turned off, a voltage at the drain electrode thereof, namely, the second node n2 is defined as a compensation voltage VSS+Vth2 that is the sum of the first voltage of the AC voltage VSS and a threshold voltage Vth2 of the second driving switching element Tr_Dv2. This compensation voltage VSS+Vth2 is supplied to the second data line DL2 through the turned-on second sensing switching element Tr_SS2. Consequently, in the sixth period T6, a voltage on the second data line DL2 is defined as the compensation voltage VSS+Vth2.

The compensation voltage VSS+Vth2 from the second data line DL2 is supplied to the data driver DD and then stored in the memory provided in the data driver DD. The data driver DD corrects the original data voltage using the compensation voltage VSS+Vth2 stored in the memory, and supplies the corrected data voltage to the second data line DL2 in a next specific period.

In the seventh period T7, only the first and second scan signals SS1 and SS2 have the active state, or high state. As a result, the first scan switching element Tr_SC1, supplied with the first scan signal SS1 of the high state through the gate electrode thereof, is turned on, and the second scan switching element Tr_SC2, supplied with the second scan signal SS2 of the high state through the gate electrode thereof, is turned on.

On the other hand, for this seventh period T7, the corrected data voltage VD1 is supplied to the first data line DL1 and the deterioration prevention voltage VC2 is supplied to the second data line DL2.

The deterioration prevention voltage VC2 supplied to the second data line DL2 is supplied to the third node n3, namely, the gate electrode of the second driving switching element Tr_Dv2 through the turned-on second scan switching element Tr_SC2. Because the deterioration prevention voltage VC2 has a polarity opposite to that of the data voltage (i.e., the corrected data voltage VD1 supplied to the first data line), the second driving switching element Tr_Dv2, supplied with a positive corrected data voltage in a previous frame period, is prevented from deterioration by the negative deterioration prevention voltage VC2 supplied in this seventh period T7.

Meanwhile, the corrected data voltage VD1 supplied to the first data line DL1 is supplied to the first node n1, namely, the gate electrode of the first driving switching element Tr_Dv1 through the turned-on first scan switching element Tr_SC1. The corrected data voltage VD1 at the first node n1 is stably maintained by the first storage capacitor Cst1.

Thereafter, in the eighth period T8, the AC voltage VSS is changed from the first voltage to the second voltage, thereby causing the first driving switching element Tr_Dv1 to be turned on, resulting in generation of driving current flowing from the drain electrode of the turned-on first driving switching element Tr_Dv1 to the source electrode thereof. As a result, in this eighth period T8, the light emitting element OLED emits light with a brightness corresponding to the corrected data voltage VD1.

FIG. 3B is a second timing diagram of the various signals which are supplied to the pixel of FIG. 2.

The second timing diagram of FIG. 3B is substantially similar to the above-stated first timing diagram of FIG. 3A, with the exception that the AC voltage VSS is changed from the first voltage to the second voltage with a timing different from that in the first timing diagram. That is, as shown in FIG. 3B, the AC voltage VSS is maintained at the first voltage in the first and second periods T1 and T2 and the fifth and sixth periods T5 and T6, while at the second voltage in the third and fourth periods T3 and T4 and the seventh and eighth periods T7 and T8.

The use of the AC voltage VSS as shown in FIG. 3A can compensate for rising of the AC voltage VSS. In contrast, the use of the AC voltage VSS as shown in FIG. 3B enables the use of a data voltage of a low voltage, thereby reducing power consumption.

As described above, in the present invention, one pixel includes two driving switching elements Tr_Dv1 and Tr_Dv2 which are alternately driven. In particular, when one of the two driving switching elements is driven by a corrected data voltage, the other driving switching element is driven by a deterioration prevention voltage, which has a polarity opposite to that of the corrected data voltage, thereby preventing the driving switching elements from being deteriorated.

In addition, in the present invention, a threshold voltage of a driving switching element of each pixel is detected on a pixel basis and a data voltage to be supplied to each pixel is corrected based on the detected threshold voltage, thereby preventing brightness differences among the pixels, so as to prevent a degradation in picture quality.

As apparent from the above description, an organic light emitting diode display according to the present disclosure the follows effects.

With the present disclosure a threshold voltage of a driving switching element of each pixel is detected on a pixel basis and a data voltage to be supplied to each pixel is corrected based on the detected threshold voltage, thereby preventing brightness differences among the pixels, so as to prevent a degradation in picture quality.

Further, two driving switching elements, which are alternately driven, are installed in one pixel and, when a corrected data voltage is supplied to one of the two driving switching elements, a deterioration prevention voltage, which has a polarity opposite to that of the corrected data voltage, is supplied to the other driving switching element, thereby preventing the driving switching elements from being deteriorated.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An organic light emitting diode display comprising:
a first scan switching element controlled in response to a first scan signal from a first scan line, the first scan switching element being connected between a first data line and a first node;
a first storage capacitor connected between the first node and an alternating current (AC) voltage supply line;
a first driving switching element controlled in response to a signal applied to the first node, the first driving switching element being connected between a second node and the AC voltage supply line;
a light emitting element connected between a high-level voltage supply line and the second node;
a first sensing switching element controlled in response to a first gate signal from a first gate line, the first sensing switching element being connected between the first data line and the second node;
a second scan switching element controlled in response to a second scan signal from a second scan line, the second scan switching element being connected between a second data line and a third node;
a second storage capacitor connected between the third node and the AC voltage supply line; and
a second driving switching element controlled in response to a signal applied to the third node, the second driving switching element being connected between the second node and the AC voltage supply line.

2. The organic light emitting diode display according to claim 1, wherein:
an AC voltage from the AC voltage supply line exhibits a first voltage in first to third periods and fifth to seventh periods and a second voltage in fourth and eighth periods;
the first voltage is higher than the second voltage;
the first scan signal exhibits an active state in the first to third periods and the seventh period and an inactive state in the fourth to sixth periods and the eighth period;
the second scan signal exhibits the active state in the third period and the sixth and seventh periods and the inactive state in the first and second periods, the fourth and fifth periods and the eighth period;
the first gate signal exhibits the active state in the second period and the inactive state in the first period and the third to eighth periods;
a second gate signal exhibits the active state in the sixth period and the inactive state in the first to fifth periods and the seventh and eighth periods;
a threshold voltage detection voltage is supplied to the first data line in the first period and to the second data line in the fifth period;
a first corrected data voltage is supplied to the second data line in the third period, and a first deterioration prevention voltage is supplied to the first data line in the third period, the first deterioration prevention voltage having a polarity opposite to that of the first corrected data voltage; and
a second corrected data voltage is supplied to the first data line in the seventh period, and a second deterioration prevention voltage is supplied to the second data line in the seventh period, the second deterioration prevention voltage having a polarity opposite to that of the second corrected data voltage.

3. The organic light emitting diode display according to claim 1, wherein:
an AC voltage from the AC voltage supply line exhibits a first voltage in first and second periods and fifth and sixth periods and a second voltage in third and fourth periods and seventh and eighth periods;
the first voltage is higher than the second voltage;
the first scan signal exhibits an active state in the first to third periods and the seventh period and an inactive state in the fourth to sixth periods and the eighth period;
the second scan signal exhibits the active state in the third period and the sixth and seventh periods and the inactive state in the first and second periods, the fourth and fifth periods and the eighth period;
the first gate signal exhibits the active state in the second period and the inactive state in the first period and the third to eighth periods;
a second gate signal exhibits the active state in the sixth period and the inactive state in the first to fifth periods and the seventh and eighth periods;
a threshold voltage detection voltage is supplied to the first data line in the first period and to the second data line in the fifth period;
a first corrected data voltage is supplied to the second data line in the third period, and a first deterioration prevention voltage is supplied to the first data line in the third period, the first deterioration prevention voltage having a polarity opposite to that of the first corrected data voltage; and
a second corrected data voltage is supplied to the first data line in the seventh period, and a second deterioration prevention voltage is supplied to the second data line in the seventh period, the second deterioration prevention voltage having a polarity opposite to that of the second corrected data voltage.

4. The organic light emitting diode display according to claim 2, wherein the first and second corrected data voltages are positive and the first and second deterioration prevention voltages are negative.

* * * * *